United States Patent
Burd (10) Patent No.: US 9,946,599 B1
(45) Date of Patent: Apr. 17, 2018

(54) SYSTEMS AND METHODS FOR ENHANCED DATA ACCESS TO A HARD DISK DRIVE WITH CACHING

(71) Applicant: Marvell International Ltd., Hamilton (BM)

(72) Inventor: Gregory Burd, San Jose, CA (US)

(73) Assignee: Marvell International Ltd., Hamilton (BM)

(*) Notice: Subject to any disclaimer, the term of this patent is extended or adjusted under 35 U.S.C. 154(b) by 7 days.

(21) Appl. No.: 15/136,466

(22) Filed: Apr. 22, 2016

Related U.S. Application Data (60) Provisional application No. 62/151,347, filed on Apr. 22, 2015.

(51) Int. Cl.
*G06F 11/10* (2006.01)
*G06F 3/06* (2006.01)
*G06F 12/0871* (2016.01)

(52) U.S. Cl.
CPC ........ *G06F 11/1076* (2013.01); *G06F 3/0619* (2013.01); *G06F 3/0653* (2013.01); *G06F 3/0685* (2013.01); *G06F 3/0689* (2013.01); *G06F 12/0871* (2013.01); *G06F 2212/1016* (2013.01); *G06F 2212/1032* (2013.01); *G06F 2212/60* (2013.01)

(58) Field of Classification Search
CPC .................................................. G06F 11/1076
USPC .................................. 714/764, 767, 770, 772
See application file for complete search history.

(56) References Cited

U.S. PATENT DOCUMENTS

| | | | |
|---|---|---|---|
| 6,266,712 B1* | 7/2001 | Henrichs | G06F 3/0608 710/8 |
| 6,934,467 B1* | 8/2005 | Herz | H04N 9/8042 386/200 |
| 7,730,347 B1* | 6/2010 | Yang | G06F 11/1076 714/15 |
| 8,599,508 B1 | 12/2013 | Burd | |
| 8,625,215 B1 | 1/2014 | Burd et al. | |
| 8,817,400 B1 | 8/2014 | Nangare et al. | |
| 8,837,074 B1 | 9/2014 | Burd et al. | |
| 9,122,588 B1* | 9/2015 | Mondal | G06F 12/0246 |
| 2007/0016694 A1* | 1/2007 | Achler | H03M 7/3088 709/247 |
| 2016/0170639 A1* | 6/2016 | Velayudhan | G06F 3/061 711/114 |

* cited by examiner

*Primary Examiner* — Fritz Alphonse (57) ABSTRACT

Systems and methods described herein provide a method for enhanced data access to a hard disk drive with caching. The method includes obtaining data for storage from a data source. The method further includes applying at least one of a track error-correcting code scheme, a redundant array of independent disks (RAID) encoder, streaming inter-track interference cancellation and a lower power read-data channel to the obtained data. The method further includes configuring a caching system to store a frequently accessed portion of the encoded data, and receiving, from a host computer, a data access request. The method further includes retrieving a data file from the caching system to the host computer in response to the data access request.

20 Claims, 9 Drawing Sheets

SYSTEMS AND METHODS FOR ENHANCED DATA ACCESS TO A HARD DISK DRIVE WITH CACHING

CROSS-REFERENCE TO RELATED APPLICATION

This disclosure claims the benefit of U.S. Provisional Patent Application No. 62/151,347, filed Apr. 22, 2015, which is hereby incorporated by reference herein in its entirety.

FIELD OF USE

This disclosure relates to a read-data channel (RDC) solution for data access to a hard disk drive (HDD) with caching.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Computer systems can often use a hard disk drive (HDD) for storing digital information. The HDD stores information on one or more rigid rapidly rotating disks coated with magnetic material. A magnetic head configured on a moving actuator arm can read and write data to the surface of the disk. The data access time is largely determined by the revolutions the HDD can make in a single minute. The higher the revolutions per minute (RPM) is, the faster the data can be accessed. Thus HDD's RPM largely determines the throughput of data access.

SUMMARY

Systems and methods described herein provide a method for enhanced data access to a hard disk drive with caching. The method includes obtaining data for storage from a data source. The method further includes applying at least one of a track error-correcting code scheme, a redundant array of independent disks (RAID) encoder, streaming inter-track interference cancellation and a lower power read-data channel to the obtained data. The method further includes configuring a caching system to store a frequently accessed portion of the encoded data, and receiving, from a host computer, a data access request. The method further includes retrieving a data file from the caching system to the host computer in response to the data access request.

In some implementations, the method further includes configuring a media format with a track skew for the hard disk drive to allow time for the track error-correcting code scheme such that hardware complexity requirement of a track error-correcting code decoder is relaxed.

In some implementations, the method further includes encoding a sector on each track to be a parity check of other sectors on the respective track, or encoding a track to be a parity check of other tracks within a same zone.

In some implementations, the caching system includes any of a solid state drive or the outer diameter zone of a hard disk drive.

In some implementations, the method further includes encoding the obtained data via the track error-correcting code scheme or the RAID encoder, and deploying streaming inter-track interference cancellation to cancel inter-track-interference on a decoder side.

In some implementations, the method further includes reading data from a current track from the hard disk drive, and using a decision from a previously read track to cancel inter-track interference from the current track to achieve signal-to-noise ratio performance comparable to a two-dimensional magnetic recording at a lower throughput.

In some implementations, the streaming inter-track interference cancellation is applied with a single reader to achieve two-dimensional magnetic recording performance such that hardware complexity requirement of the hard disk drive is relaxed.

In some implementations, the obtained data is encoded via three-level encoding, and the three-level encoding includes a media sector error-correcting code, a track error-correcting code and a zone error-correcting code.

In some implementations, the RAID encoder is followed by a sector iterative encoder.

In some implementations, the method further includes employing a message passing decoder to decode a three-level code including a media sector error-correcting code, a track error-correcting code and a RAID error-correcting code.

The systems and methods described herein further provide a system for enhanced data access to a hard disk drive with caching. The system includes a data encoder to obtain data for storage from a data source, and to apply at least one of a track error-correcting code scheme, a RAID encoder, streaming inter-track interference cancellation and a lower power read-data channel to the obtained data. The system further includes a hard disk drive to store the encoded data. The system further includes a caching system to store a frequently accessed portion of the encoded data, to receive, from a host computer, a data access request, and to retrieve a data file from the caching system to the host computer in response to the data access request.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems to optimize hard drive disk (HDD) cost/performance in a hybrid storage device. More specifically, the cost and/or performance of HDD's read-date channel (RDC) component in light of a hybrid drive architecture. According to this disclosure, a caching system may be employed as a part of hybrid drive to cache data with a high hit rate such that a host computer can retrieve frequently accessed data files from the cache (instead of HDD). In such a system, overall hybrid drive performance may no longer depend heavily on the HDD throughput, as a good caching algorithm may provide that data requested by a host computer is located in the cache with a high probability. Subsequently, the cost and/or performance for an architecture of HDD's RDC component can be optimized by reducing an overall cost of a hybrid storage device.

In one embodiment, RDC may implement error correcting code (ECC) on a track level (in addition to a sector level ECC) in order to improve HDD's capacity. Track ECC may improve the amount of data stored on HDD, but at the same time reduce performance (throughput). However, this may not be a concern in a hybrid drive solution, due to weak dependence of hybrid drive performance on that of HDD's performance.

Figure 1:
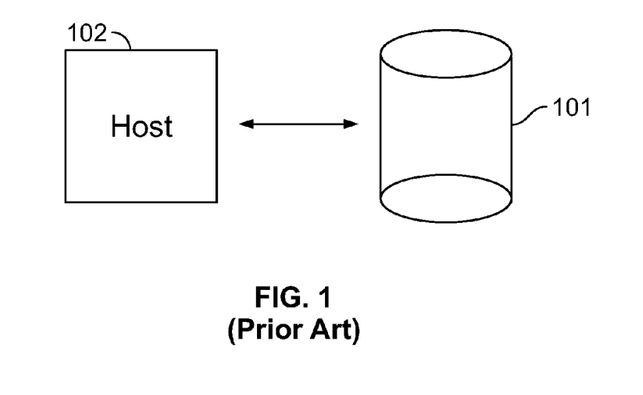
FIG. 1 provides an exemplary block diagram illustrating an existing HDD architecture, in accordance with various embodiments of the disclosure.

FIG. 1 provides an exemplary block diagram illustrating an existing HDD architecture, in accordance with various embodiments of the disclosure. As shown in FIG. 1, a host computer 102 accesses an HDD 101 directly to read data. In this case, when the host computer expects a high data throughput, data performance largely depends on the achievable data throughput of the HDD 101. Thus, the HDD 101 architecture may need to be geared towards signal processing and error correction methods that achieve improvements in on-the-fly mode of operation—i.e. at the target throughput of storage system.

Figure 2:
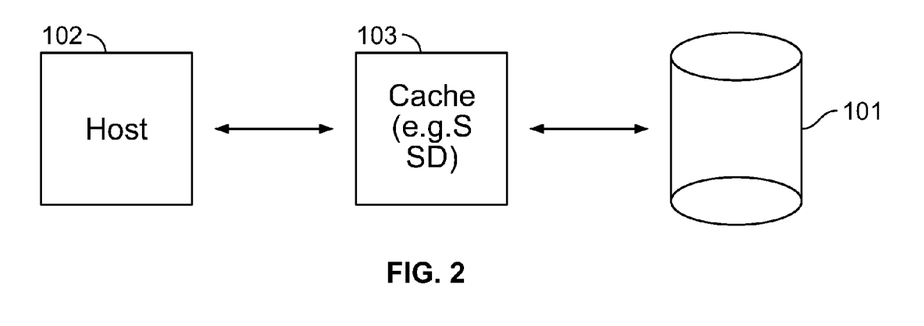
FIG. 2 provides an exemplary block diagram illustrating hybrid storing system that utilizes HDD and another memory for caching, in accordance with various embodiments of the disclosure.

FIG. 2 provides an exemplary block diagram illustrating hybrid storing system that utilizes HDD and another memory for caching, in accordance with various embodiments of the disclosure. A cache element 103 may be placed in front of the HDD 101 to store frequently accessed data files. For example, such system may include a hybrid drive, where a solid state drive (SSD) is used as the cache 103. For another example, an outer diameter (OD) zone of an HDD can be used as the cache 103. For another example, the HDD 101 can be an array of HDD drives and the cache 103 may be an SSD cache. Thus, when the host computer 102 can access the cache 103 to read frequently accessed files, the throughput of HDD 101 may no longer restrain the system data performance.

Figure 3:
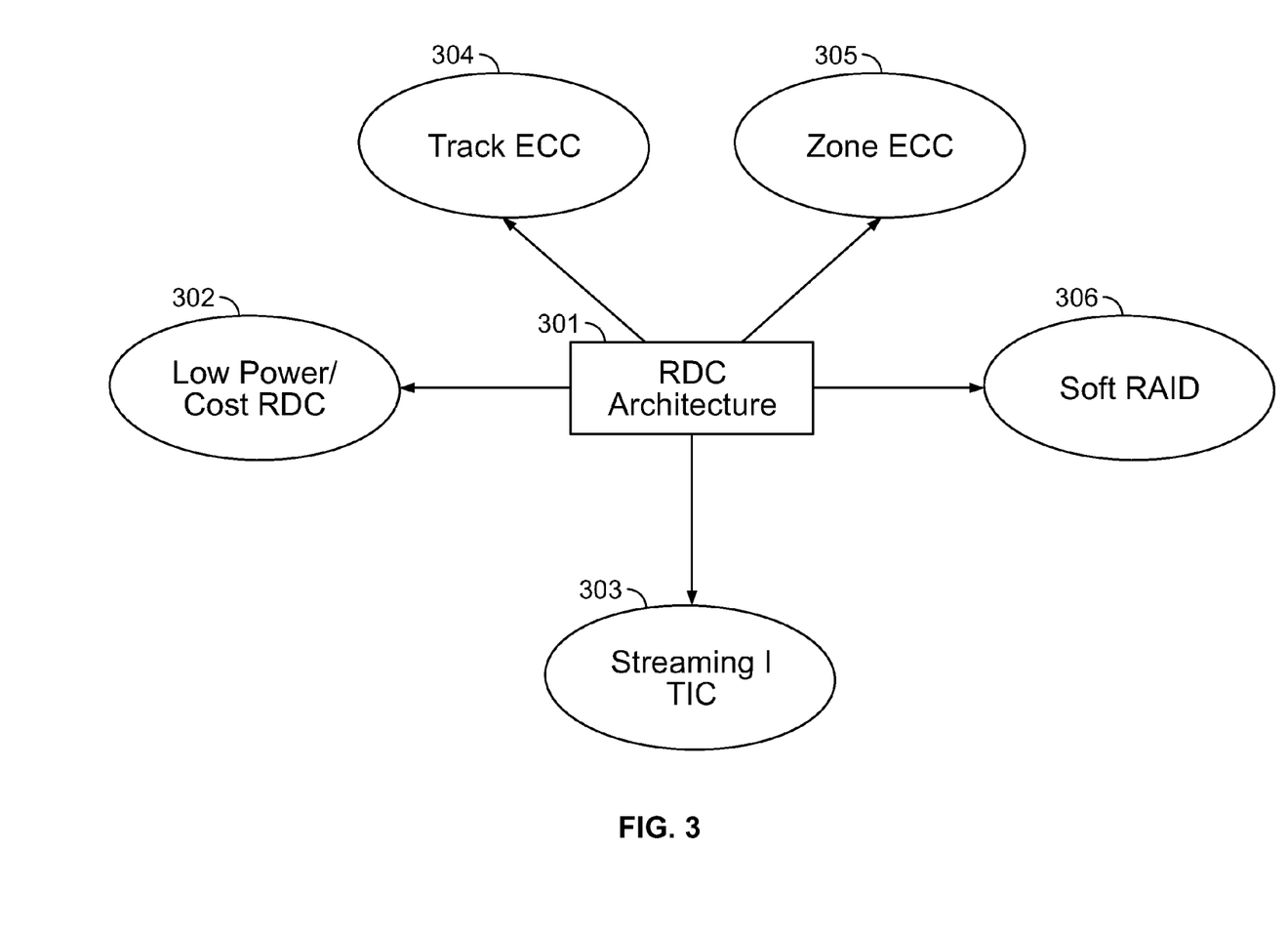
FIG. 3 provides an example block diagram illustrating various possibilities to re-optimize HDD's cost/capacity/performance in a hybrid drive system, in accordance with various embodiments of the disclosure.

FIG. 3 provides an example block diagram illustrating various possibilities to re-optimize HDD's cost/capacity/performance in a hybrid drive system, in accordance with various embodiments of the disclosure. The RDC architecture 301 may be implemented with an HDD controller at the HDD (e.g., 101 in FIG. 2), and include various components including but not limited to a low power/cost RDC 302, a streaming inter-track interference cancellation (ITIC) component 303, a track ECC component 304, a zone ECC component 305, and a soft RAID component 306.

In some implementations, with the cache (e.g., 103 in FIG. 2) in front of HDD (e.g., 101 in FIG. 2), it is possible to spin down the HDD without noticeable performance impact to the host computer (e.g., 102 in FIG. 2), and thus achieve a low power/cost RDC 302. For example, reducing the revolutions per minute (RPM) of the HDD by a factor of 2× may allow the RDC architecture 301 to achieve a 10%-15% area reduction and a 25%-30% power reduction while maintaining the signal-to-noise ratio (SNR). Although the area density (AD) of HDD may not be significantly improved by such configuration, the low power/cost RDC architecture can be used in a system that may not benefit from additional AD again, e.g., a mobile 2.5 inch 1 TB drive with a high yield, etc.

In another embodiment, streaming ITIC component 303 may help to reduce inter-track interference. For example, HDD may adopt two-dimensional magnetic recording (TDMR) utilizing a multi-reader head in an on-the-fly (OTF) mode of operation to increase HDD's capacity (amount of data stored on the HDD). However, the multi-reader TDMR head may require additional cost, e.g., more expensive reader, special pre-amplifier, a larger number of lex lines between the reader and HDC, etc. With the HDD with a caching system, the advantages of TDMR can be realized via streaming Inter-Track-Interference Cancelation (ITIC) without inducing significant hardware overhead as the HDD throughput can be moderated without significantly impacting overall Hybrid system performance.

Figure 4:
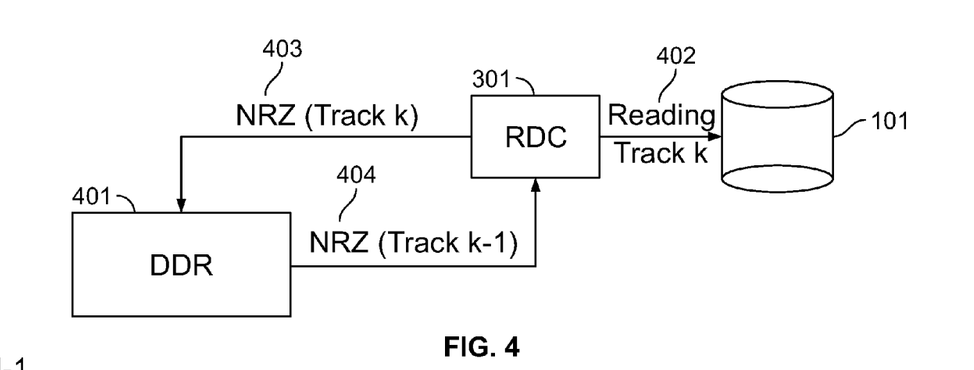
FIG. 4 provides an exemplary block diagram illustrating a streaming ITIC cancellation scheme, in accordance with various embodiments of the disclosure.

FIG. 4 provides an exemplary block diagram illustrating a streaming ITIC cancellation scheme, in accordance with various embodiments of the disclosure. In some implementations, a data read attempt may obtain data bits from track K 402 from the HDD 101. The RDC 301 may then transmit the non-return-to-zero (NRZ) bits, e.g., the actual data bits 403 of track K to a double data rate (DDR) memory unit 401. The DDR 401 may in turn send the actual bits 404 from a previously successfully read track, e.g., track K−1 to RDC 301. In this way, decisions from a previously read track can be used to cancel ITI from the current track. Further discussion on streaming ITIC can be found in commonly-assigned U.S. Pat. No. 8,837,074, issued on Sep. 16, 2014, titled "Method and System for Compensating for Track Squeeze"; U.S. Pat. No. 8,817,400, issued on Aug. 26, 2014, titled "Storage Device Interface for Shingled Magnetic Recording System"; U.S. Pat. No. 8,599,508, issued on Dec. 3, 2013, titled "Method and System for Compensating for Adjacent Tracks During Reading of Data"; and U.S. Pat. No. 8,625,215, issued on Jan. 7, 2014, titled "Method and System for Compensating for Adjacent Tracks During Writing of Data." The aforementioned patents are all hereby expressly incorporated by reference in their entirety.

A single reader at the HDD with the Streaming ITI cancellation may achieve a similar SNR as a two-reader TDMR head. Similarly, a two reader TDMR at the HDD with the streaming ITI cancellation may achieve a similar SNR as a three-reader TDMR head. On the other hand, in the random read mode, reading an adjacent track (e.g., track K−1 404) prior to reading the target track (e.g., track K 403) may result in a small throughput hit. In this mode, system throughput is dominated by seek time. In a continuous read mode, streaming ITIC may result in an initial delay without any throughput loss. Thus, in this way, the streaming ITIC component (e.g., 303 in FIG. 2) may help to achieve TDMR performance with some impact on HDD throughput. However, in a hybrid drive solution, performance hit to an HDD may not have significant impact on overall storage system's performance.

Figure 5:
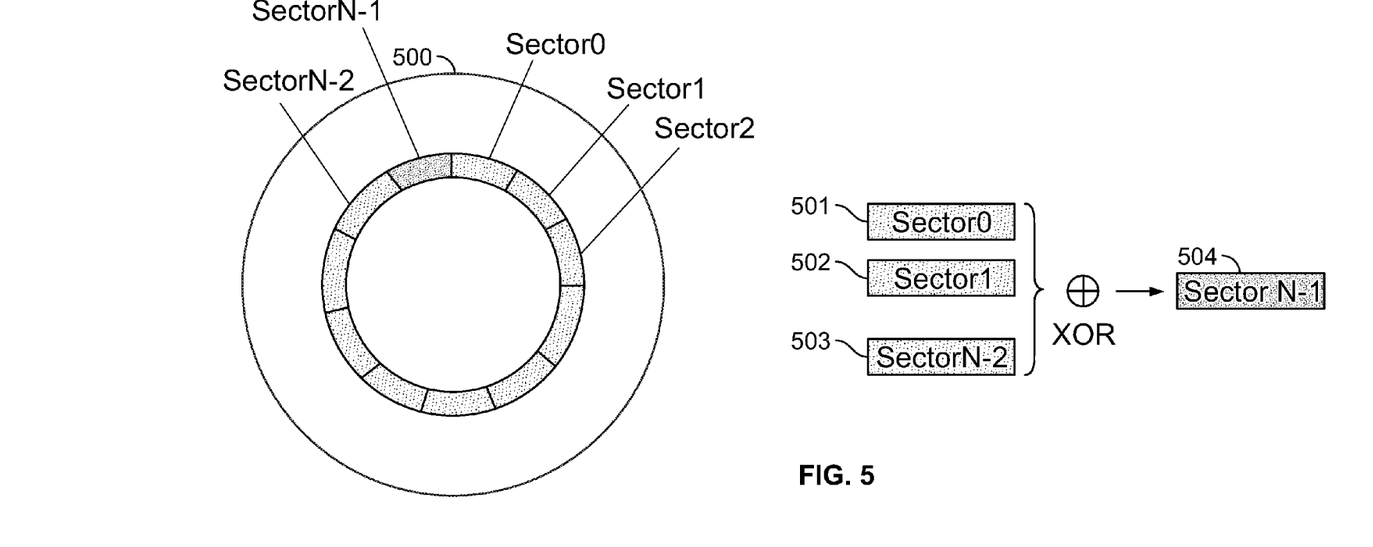
FIG. 5 provides an exemplary block diagram illustrating a track ECC scheme, in accordance with various embodiments of the disclosure.

FIG. 5 provides an exemplary block diagram illustrating a track ECC scheme, in accordance with various embodiments of the disclosure. For each HDD disk 500, there can be N sectors within the given track. Instead of using all N sectors for user data, the last sector, e.g., sector N−1 504, can be used for parity. For example, the parity sector 504 can be the XOR of other sectors 501-503. track ECC error correction capability is one sector in hard decoding mode, and T sectors in soft decoding mode (by utilizing iterative decoder to iterate between soft sector level ECC decoder & soft track ECC decoder), where the number T depends on the SNR of the failed sectors.

Figure 6:
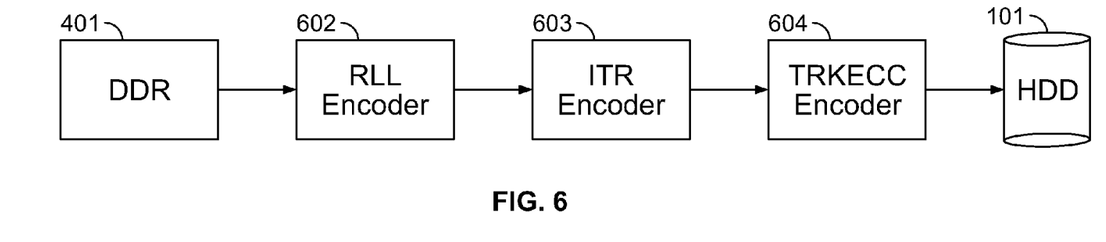
FIG. 6 provides an exemplary block diagram illustrating an encoding data path for the HDD, in accordance with various embodiments of the disclosure.

FIG. 6 provides an exemplary block diagram illustrating an encoding data path for the HDD, in accordance with various embodiments of the disclosure. Data from the DRAM 401 can be fed into the run-length limited (RLL) encoder 602, and an iterative (ITR) encoder 603. The HDD may then implement the track ECC encoder 604 to encode data stored at the HDD 101.

Figure 7:
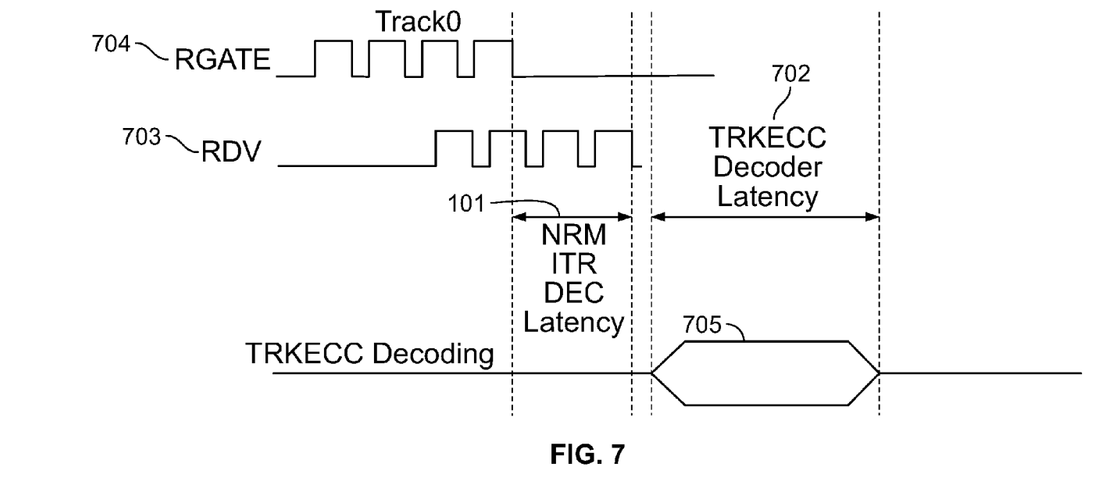
FIG. 7 provides an exemplary diagram illustrating track ECC decoder latency, in accordance with various embodiments of the disclosure.

FIG. 7 provides an exemplary diagram illustrating track ECC decoder latency, in accordance with various embodiments of the disclosure. The corresponding track ECC decoder latency can then be broken into two parts, the normal ITR decoder (sector level ITR decoder) latency 701 and track ECC decoder latency 702. As long as the track decoder operation can finish during a head track switch time, overall system throughput can be maintained. Therefore, the head switch time gaits AD gain from the track ECC decoder: larger head switch time would allow more time for the track ECC decoder to run, therefore leading to netter AD. A smaller head track switch time, may limit the number of iterations for the track ECC decoder, and thus clamp the AD gain Increasing head switch time in a conventional HDD may not be desirable, as it impacts seek time and/or HDD performance. However, this is no longer the case in a hybrid system. One way to realize this trade-off in a real system is to increase track skew interval (e.g., the distance between sector 0 on two consecutive tracks). For example, the media format of the storage can be chosen to have a larger track skew to allow more time for track ECC decoding. Thus hardware complexity requirement of the track ECC decoder can be relaxed while the AD gains can be maintained.

It should be noted that it is possible to remove the limitation on the track ECC decoder latency to be within head zone switch time, by allowing the track ECC decoder to run concurrently with normal sector level ECC decoder. However, this would lead to a significant cost increase (higher complexity), and therefore may not be desirable solution for a hybrid storage device.

Figure 8:
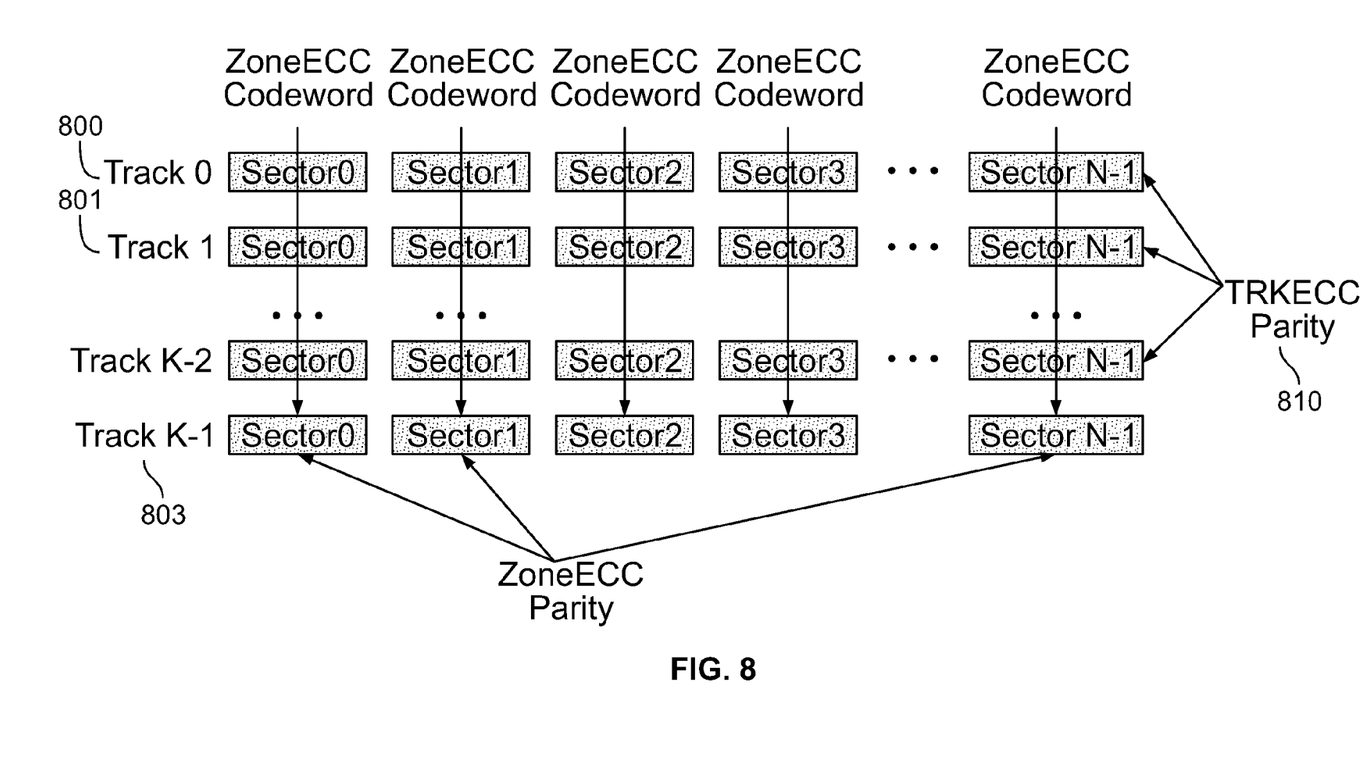
FIG. 8 provides an exemplary block diagram illustrating zone ECC, in accordance with various embodiments of the disclosure.

FIG. 8 provides an exemplary block diagram illustrating zone ECC, in accordance with various embodiments of the disclosure. The zone ECC may extend the track ECC to a zone. For example, for each track (e.g., track 0 800, track 1 801, etc.), the sector N−1 can be used as the track ECC parity sector 810, as discussed in FIG. 5. In addition, across different tracks, track K−1 can be used as the zone ECC parity track, e.g., sector 0 of track K−1 can be the XOR of all sector 0s of tracks 1 to K−2, and/or the like. In this way, the zone ECC has a three-level code, including a media sector ECC, a track ECC and a zone ECC. The zone ECC can offer protection against events such as track squeeze. As the zone ECC spans the entire zone of an HDD, zone ECC decoding may incur a non-trivial throughput hit to the HDD. Thus the RDC architecture with a caching system as shown in FIG. 2 may help maintain the system data performance.

Figure 9:
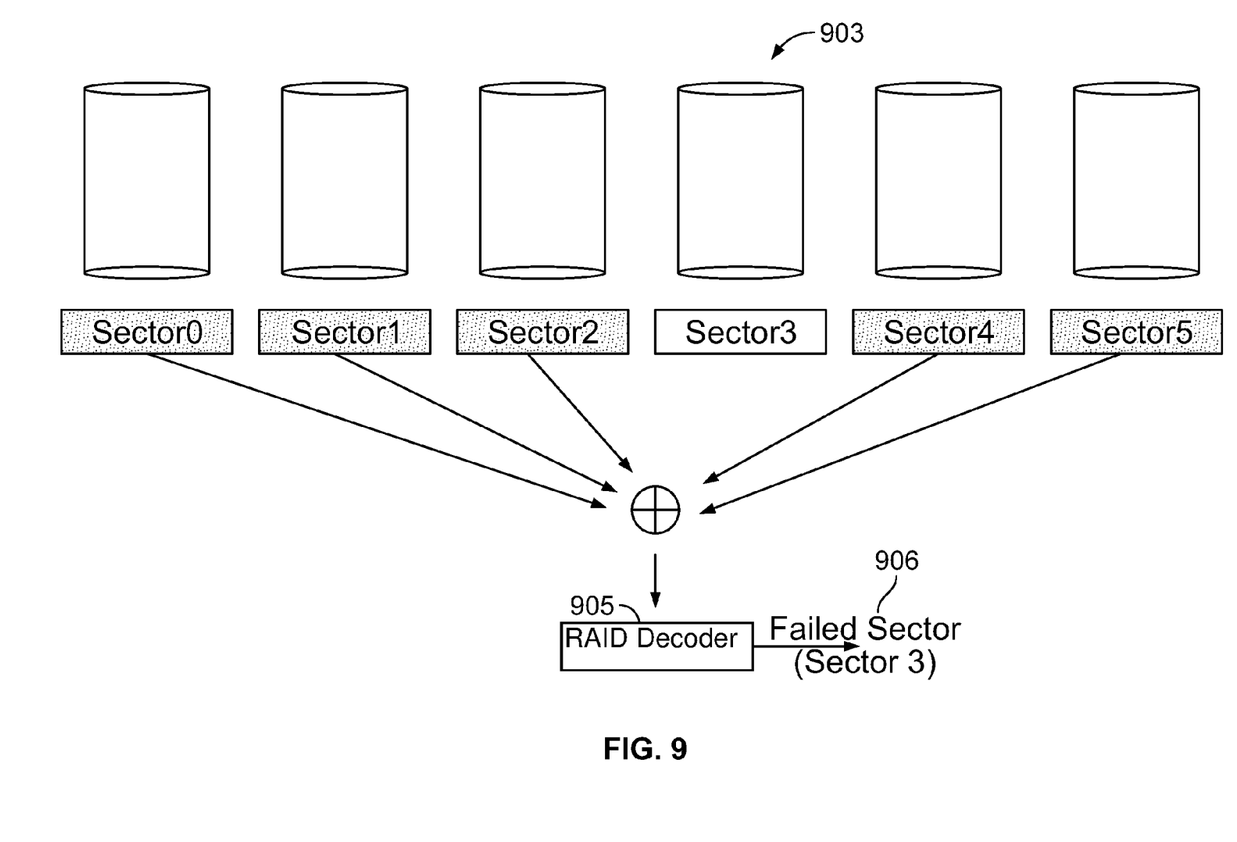
FIG. 9 provides an exemplary diagram illustrating a traditional RAID decoder for a track ECC, in accordance with various embodiments of the disclosure.

FIG. 9 provides an exemplary diagram illustrating a traditional RAID decoder, in accordance with various embodiments of the disclosure. In some implementations, an array of drives storage systems may employ RAID to protect against HDD failures. In this way, as shown at 903, when a sector fails, the RAID decoder 905 may report a failed sector 906. RAID may be decoded using a hard decoder, e.g., an algebraic decoder. In some implementations, it is possible to decode RAID with a soft decoder, e.g., similar to a track ECC decoder by iterating between RAID code and sector level iterative code.

Figure 10:
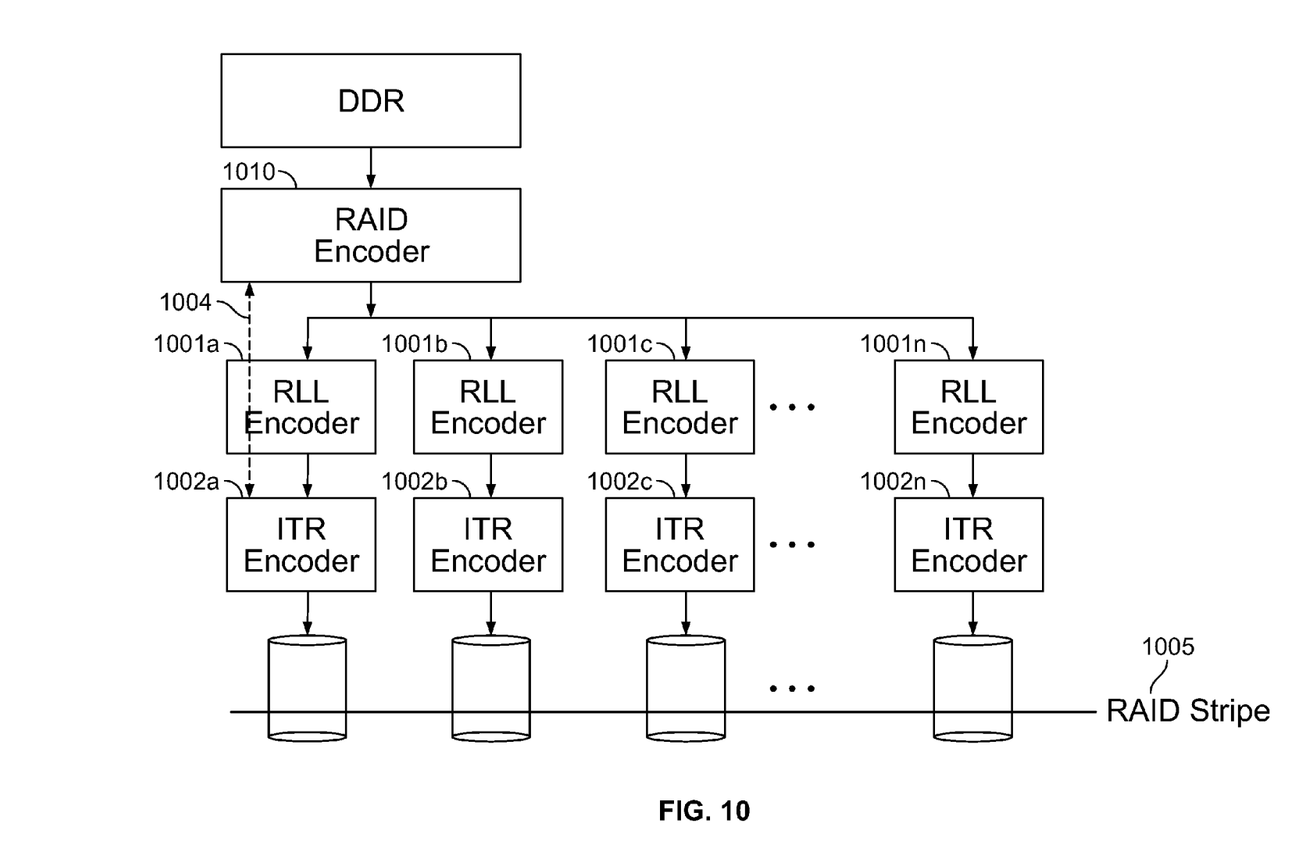
FIG. 10 provides an exemplary diagram illustrating a traditional soft RAID decoder, in accordance with various embodiments of the disclosure.

For example, FIG. 10 provides an exemplary diagram illustrating a traditional soft RAID decoder, in accordance with various embodiments of the disclosure. With a traditional RAID system, soft RAID decoding can be complicated by having a RLL encoder (e.g., 1001*a-n*) in between a RAID encoder 1010 and an ITR encoder (e.g., 1001*a-n*). Thus, it can be difficult to exchange soft information across the RLL decoders 1001*a-n* between sector level ITR 1002*a-n* and the RAID decoder 1010, at 1004. The RAID stripe 1005 is a collection of sectors that form a single RAID codeword.

Figure 11:
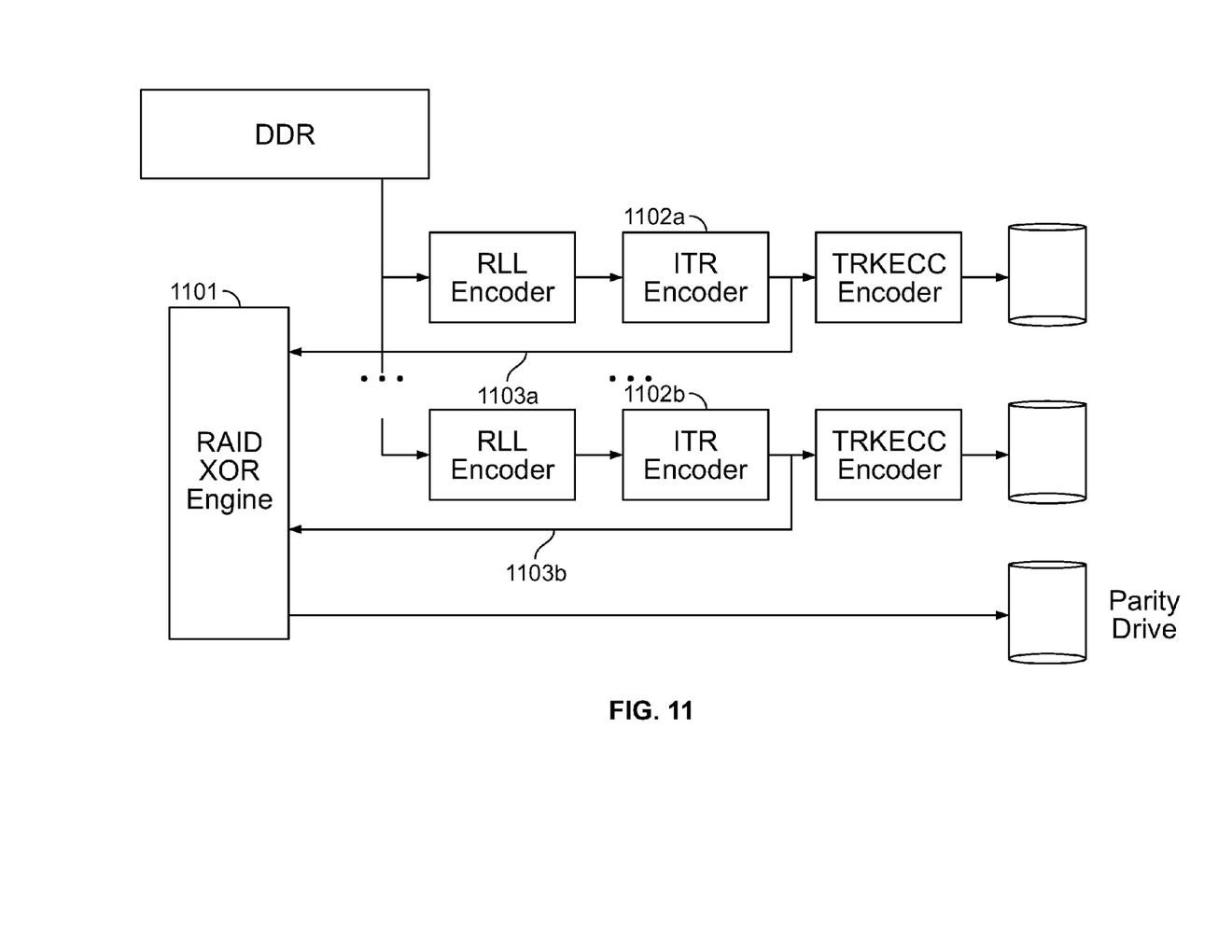
FIG. 11 provides an exemplary diagram illustrating an enhanced soft RAID decoder, in accordance with various embodiments of the disclosure.

In an alternative embodiment, FIG. 11 provides an exemplary diagram illustrating an enhanced soft RAID decoder, in accordance with various embodiments of the disclosure. As shown in FIG. 11, the RAID encoder 1101 can be moved closer to the sector ITR encoders 1102*a-b* by adding an additional connection 1103*a-b*. In this way, the soft decoding of RAID can be implemented. With the proposed configuration hard RAID decoder error correction power would remain unchanged (1 sector per RAID stripe). However if soft RAID decoder is employed (by iterating between soft sector level LDPC decoder and soft track ECC decoder and the soft RAID decoder), then the number of failed sectors that can be corrected would increase significantly, to 20-30 sectors per RAID stripe. The soft RAID throughput can be made relatively high. Thus, the soft RAID can include a three-level code, e.g., the media sector ECC, the track ECC and the RAID ECC with soft error recovery capability.

Figure 12:
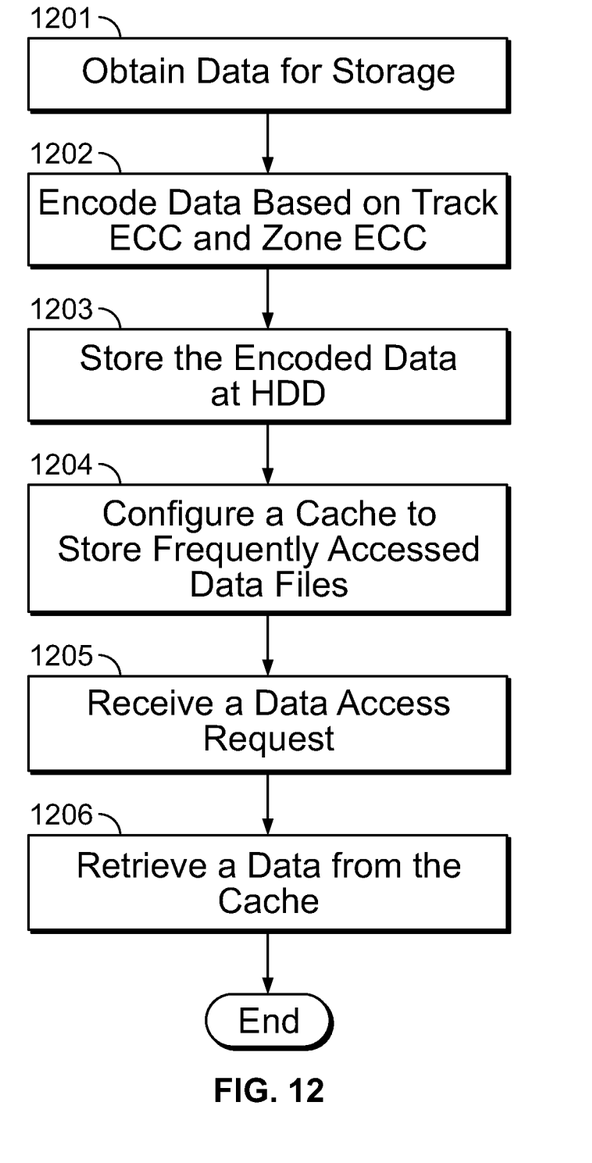
FIG. 12 provides an exemplary logic flow diagram illustrating operations of the enhanced RDC architecture (e.g., 301 in FIG. 3), in accordance with various embodiments of the disclosure.

FIG. 12 provides an exemplary logic flow diagram illustrating operations of the enhanced RDC architecture (e.g., 301 in FIG. 3), in accordance with various embodiments of the disclosure. At 1201, the RDC architecture may obtain data for storage, e.g., from a DRAM unit 401 in FIG. 4. The RDC may then encode the data based on a combined track ECC and zone ECC encoding scheme, at 1202. The encoded data may then be stored at an HDD at 1203. A caching system (e.g., 103 in FIG. 2) may be configured to store frequently accessed data files from the HDD, at 1204. Thus, when the HDD receives a data access request, e.g., from a host computer (e.g., 102 in FIG. 2) at 1205, the caching system may retrieve the requested data file to provide to the host computer, at 1206. In this way, when the combined track ECC and zone ECC encoding scheme may slow down the HDD throughput, the caching system may help to maintain data performance such that data retrieval experience does not solely rely on the HDD throughput.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for enhanced data access to a hard disk drive with caching, the method comprising:
   obtaining data files for storage from a data source;
   storing the obtained data at a hard disk drive;
   applying at least one of a track error-correcting code scheme, a redundant array of independent disks (RAID) scheme, streaming inter-track interference cancellation and a low complexity and power read-data channel to the obtained data files;
   configuring a caching system to store a data file from the obtained data files, wherein the data file has previously been frequently accessed;
   receiving, from a host computer, a data access request; and
   retrieving the data file from the caching system to the host computer in response to the data access request.

2. The method of claim 1, further comprising:
   configuring a media format with a track skew for the hard disk drive to allow time for the track error-correcting code scheme such that hardware complexity requirement of a track error-correcting code decoder is relaxed.

3. The method of claim 1, further comprising:
   encoding a sector on each track to be a parity check of other sectors on the respective track, or
   encoding a track to be a parity check of other tracks within a same zone.

4. The method of claim 1, wherein the caching system includes any of a solid state drive or the outer diameter zone of a hard disk drive.

5. The method of claim 1, further comprising:
   encoding the obtained data files via the track error-correcting code scheme or the RAID encoder; and
   deploying streaming inter-track interference cancellation to cancel inter-track-interference on a decoder side.

6. The method of claim 5, further comprising:
   reading data from a current track from the hard disk drive; and
   using a decision from a previously read track to cancel inter-track interference from the current track to achieve signal-to-noise ratio performance comparable to a two-dimensional magnetic recording at a lower throughput.

7. The method of claim 5, wherein the streaming inter-track interference cancellation is applied with a single reader to achieve two-dimensional magnetic recording performance such that hardware complexity requirement of the hard disk drive is relaxed.

8. The method of claim 1, wherein the obtained data files are encoded via three-level encoding, and the three-level encoding includes a media sector error-correcting code, a track error-correcting code and a zone error-correcting code.

9. The method of claim 1, wherein the RAID encoder is followed by a sector level iterative encoder.

10. The method of claim 9, further comprising:
    employing a message passing decoder to decode a three-level code including a media sector error-correcting code, a track error-correcting code and a RAID error-correcting code.

11. A system for enhanced data access to a hard disk drive with caching, the system comprising:
    a data encoder to obtain data files for storage from a data source, and to apply at least one of a track error-correcting code scheme, a redundant array of independent disks (RAID) encoder, streaming inter-track interference cancellation and a low complexity and power read-data channel to the obtained data files;
    a hard disk drive to store the obtained data files;
    a caching system to:
      store a data file from the obtained data files, wherein the data file has previously been frequently accessed,
      receive, from a host computer, a data access request, and
      retrieve the data file from the caching system to the host computer in response to the data access request.

12. The system of claim 11, wherein the hard disk drive has a media format with a track skew to allow time for the track error-correcting code scheme such that hardware complexity requirement of a track error-correcting code decoder is relaxed.

13. The system of claim 11, wherein the data encoder encodes a sector on each track to be parity check of other sectors on the respective track, or encodes a track to be parity check of other tracks within a same zone.

14. The system of claim 11, wherein the caching system includes any of a solid state drive or the outer diameter zone of a hard disk drive.

15. The system of claim 11, wherein the data encoder is further configured to:
    encode the obtained data files via the track error-correcting code scheme or the RAID encoder; and
    deploy streaming inter-track interference cancellation to cancel inter-track-interference on a decoder side.

16. The system of claim 15, wherein the hard drive disk is further configured to:
    read data from a current track from the hard disk drive; and
    use a decision from a previously read track to cancel inter-track interference from the current track to achieve signal-to-noise ratio performance comparable to a two-dimensional magnetic recording at a lower throughput.

17. The system of claim 15, wherein the streaming inter-track interference cancellation is applied with a single reader to achieve two-dimensional magnetic recording performance such that hardware complexity requirement of the hard disk drive is relaxed.

18. The system of claim 11, wherein the obtained data files are encoded via three-level encoding, and the three-level encoding includes a media sector error-correcting code, a track error-correcting code and a zone error-correcting code.

19. The system of claim 11, wherein the RAID encoder is followed by a sector level iterative encoder.

20. The system of claim 19, further comprising:
a message passing decoder to decode a three-level code including a media sector error-correcting code, a track error-correcting code and a RAID error-correcting code.

* * * * *